United States Patent
Duncan, Jr. et al.

[11] 3,922,276
[45] Nov. 25, 1975

[54] 1-SUBSTITUTED-4-BENZYLIDENEPIPERIDINES

[75] Inventors: Robert Louis Duncan, Jr.; Robert Frederick Boswell, Jr., both of Richmond, Va.

[73] Assignee: A. H. Robins Company, Incorporated, Richmond, Va.

[22] Filed: Dec. 11, 1974

[21] Appl. No.: 531,631

[52] U.S. Cl. .. 260/293.76; 260/293.72; 260/293.74; 260/293.77; 260/293.8; 260/293.83; 260/293.84; 424/267
[51] Int. Cl.² .................................. C07D 211/16
[58] Field of Search ..... 260/293.74, 293.76, 293.77, 260/293.8

[56] References Cited
UNITED STATES PATENTS

| | | | |
|---|---|---|---|
| 2,739,968 | 3/1956 | Sperber et al. | 260/293.8 |
| 2,739,969 | 3/1956 | Sperber et al. | 260/293.8 |
| 3,576,810 | 4/1971 | Duncan et al. | 260/293.74 |
| 3,806,526 | 4/1974 | Carr et al. | 260/293.84 |

*Primary Examiner*—Sherman D. Winters

[57] ABSTRACT

Novel 1-substituted-4-benzylidene piperidines useful as antiinflammatory agents and tranquilizers are represented by the formula

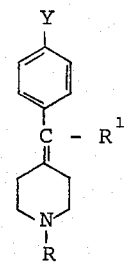

wherein R represents acetyl, aryloxyloweralkyl, aroylloweralkyl, carbamoyl, N-lower-alkylcarbamoyl, N,N-dilower-alkylcarbamoyl, N-arylcarbamoyl or 2-hydroxy-3-(o-methoxyphenoxy)propyloxycarbonyl; $R^1$ represents phenyl, p-fluorophenyl, m-trifluoromethylphenyl or cyclohexyl; Y represents hydrogen or fluorine with the proviso that when Y is hydrogen and $R^1$ is phenyl, R is other than aroylloweralkyl. The pharmaceutically acceptable acid addition salts of the basic compounds of Formula I are included as part of the invention.

8 Claims, No Drawings

1-SUBSTITUTED-4-BENZYLIDENEPIPERIDINES

FIELD OF INVENTION

The present invention relates to certain novel heterocyclic compounds which may be referred to as 1,4-disubstituted piperidines and is more particularly concerned with 1-substituted-4-(α-substituted)benzylidenepiperidines which are useful as antiinflammatory agents and tranquilizers, compositions containing the same as active ingredients, and the methods of making and using them.

U.S. Pat. No. 3,806,526 discloses 1-aroylakyl-4-diphenylmethylenepiperidines having antihistaminic, anti-allergenic, and bronchodilator activity. Great Britain Pat. No. 1,142,030 discloses optically active substituted piperidine compounds having antisecretory and central nervous system stimulating activity.

SUMMARY OF INVENTION

The invention is particularly concerned with 1-substituted-4-(α-substituted)benzylidenepiperidines represented by the following general structural formula:

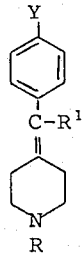 Formula I wherein;

R represents acetyl, aryloxyloweralkyl, aroylloweralkyl, carbamoyl, N-lower-alkylcarbamyl, N,N-di-lower-alkylcarbamoyl, N-arylcarbamoyl, or 2-hydroxy-3-(o-methoxyphenoxy)-propyloxycarbonyl, $R^1$ represents phenyl, p-fluorophenyl, m-trifluoromethylphenyl, or cyclohexyl, and Y represents hydrogen or fluorine with the proviso that when Y is hydrogen and $R^1$ is phenyl, R is other than aroylloweralkyl.

Included within the scope of the present invention are the pharmaceutically acceptable acid addition salts of the basic compounds of Formula I.

DETAILED DESCRIPTION OF THE INVENTION

The antiinflammatory activity was demonstrated in animals using a modification of the Evans Blue-Carrageenan Pleural Effusion Assay of Sancilio, L. F., which is described in the J. Pharmacol. Exp. Therap. 168, 199–204 (1969).

The tranquilizing properties were determined in mice using the Aggregated mice assay and the Conditioned avoidance behavior assay as described by Johnson D.N. et al., Arch. int. Pharm. and Therap. 194(1), 197–208 (1971).

It is therefore an object of the present invention to provide novel compounds and compositions possessing valuable pharmacological properties and a method for their preparation. Another object is to provide a novel method for the treatment of a living animal. Still another object is to provide compositions which possess beneficial activity and have minimum side effects. Additional objects will be apparent to one skilled in the art and still other objects will become apparent hereinafter.

In the definition of the symbols in the foregoing Formula I and where they appear elsewhere throughout this specification the terms have the following significance.

The term "lower alkyl" as used herein includes straight and branched chain radicals of up to eight carbon atoms inclusive, preferably no more than six carbon atoms, and is exemplified by such groups as methyl, ethyl, propyl, isopropyl, butyl, sec. butyl, tertiary butyl, amyl, isoamyl, hexyl, heptyl, octyl, and the like. A "lower-alkoxy" group has the formula -0-lower-alkyl.

The term "lower-alkylcarbamoyl" has the formula —C(O)NH-lower alkyl and the term "di-lower alkylcarbamoyl" has the formula —C(O)N-(lower alkyl)$_2$.

The term "benzylidene" as used herein includes the radical $C_6H_5CH=$ and α-substituted benzylidene and nuclear substituted benzylidene and α-substitute benzylidene radicals including halobenzylidene, lower-alkylbenzylidene, lower-alkoxybenzylidene, trifluoromethylbenzylidene α-phenylhalobenzylidene, α-phenylloweralkoxybenzylidene and the like.

An "aryl" radical refers to the phenyl radical or to a phenyl radical substituted by any radical or radicals which are not reactive or otherwise interfering under the conditions of reaction, such radicals including acetyl, lower alkoxy, lower alkyl, trifluoromethyl, chlorine, bromine, fluorine, and the like. The aryl radicals have preferably no more than one to three substituents such as those given above and, furthermore, these substituents can be in various available positions of the aryl nucleus and, when more than one substituent is present, can be the same or different and can be in various position combinations relative to each other.

An "aroylloweralkyl" radical has the formula aryl-C(O)-loweralkyl and includes such radicals as benzoylethyl, benzoylpropyl, halobenzoylethyl, halobenzoylpropyl, trifluoromethylbenzoylpropyl, lower-alkoxybenzoylpropyl, lower-alkylbenzoylpropyl and the like.

An "aryloxyloweralkyl" radical has the formula aryl-O-lower alkyl and includes such radicals as phenoxyethyl, phenoxypropyl, halophenoxypropyl, lower-alkoxyphenoxypropyl, halo-lower-alkoxy-phenoxypropyl, acetyl-lower alkoxyphenoxypropyl and the like.

This invention also includes pharmaceutically acceptable acid addition salts of the basic compounds of Formula I which salts are formed with nontoxic organic and inorganic acids. Such salts are conveniently prepared by methods known in the art. When the compounds are to be used as intermediates for preparing other compounds or for any other non-pharmaceutical use, the toxicity or nontoxicity of the salt is immaterial; when the compounds are to be used as pharmaceuticals, they are most conveniently used in the form of nontoxic acid-addition salts. Both toxic and nontoxic salts are therefore within the purview of the invention. The acids which can be used to prepare the preferred pharmaceutically acceptable acid addition salts are those which produce, when combined with the free bases, salts whose anions are relatively innocuous to the animal organism in therapeutic doses of the salts, so that beneficial physiological properties inherent in the free bases are not vitiated by side effects ascribable to the anions.

The base is reacted with the calculated amount of organic or inorganic acid in aqueous miscible solvent, such as ethanol or isopropanol, with isolation of the salt by concentration and cooling, or the base is reacted with an excess of the acid in aqueous immiscible solvent, such as ethyl ether or isopropyl ether, with the desired salt separating directly. Exemplary of such organic salts are those formed with oxalic, maleic, fumaric, benzoic, ascorbic, pamoic, succinic, methanesulfonic, acetic, propionic, tartaric, citric, lactic, malic, citraconic, itaconic, hexamic, p-aminobenzoic, glutamic, stearic acid and the like. Exemplary of such inorganic salts are those formed with hydrochloric, hydrobromic, sulfuric, sulfamic, phosphoric and nitric acids.

The starting materials for the novel compounds of Formula I are 4-(α-phenyl)-p-fluorobenzylidenepiperidine, 4-(α-p-fluorophenyl)-p-fluorobenzylidenepiperidine, 4-(α-phenyl)benzylidenepiperidine, 4-(α-cyclohexyl)benzylidenepiperidine and 4-(α-m-trifluoromethylphenyl)benzylidenepiperidine.

The foregoing compounds are prepared by dehydration in an acidic medium of 4-[α-(p-fluorophenyl)-α-hydroxy]-p-fluorobenzylpiperidine, 4-(α-phenyl-α-hydroxy)-p-fluorobenzylpiperidine, 4-[α-(m-trifluoromethylphenyl)-α-hydroxy]benzylpiperidine and 4-(α-cyclohexyl-α-hydroxy)benzylpiperidine or the 1-acetyl derivatives thereof. The aforementioned compounds and their method of preparation are disclosed in copending application Ser. No. 531,832 entitled 1-substituted-4-benzylpiperidines filed on even date herewith.

The details of the preparations of the starting materials are set forth in Preparations 1–5.

PREPARATION 1

4-(α-Phenyl)-p-fluorobenzylidenepiperidine

A solution of 25.0 g. (0.076 mole) of 1-acetyl-4-(α-phenyl-α-hydroxy)-p-fluorobenzylpiperidine, 300 ml. of 3N hydrochloric acid, and 200 ml. of ethanol was refluxed overnight. After cooling, the reaction mixture was made basic with 50% sodium hydroxide and diluted to about 3 liters with cold water. The mixture was extracted with benzene and the combined extracts were dried over magnesium sulfate. The mixture was filtered and the filtrate was concentrated under reduced pressure. The residual oil crystallized upon trituration in isooctane to give 17.0 g. (83.5%) of product. Recrystallization from ligroin gave the product melting at 81.5–82.5°C.

Analysis: Calculated for $C_{18}H_{18}FN$: C, 80.87; H, 6.79; N, 5.24. Found: C, 80.88; H, 6.85; N, 5.20.

PREPARATION 2

4-(α-p-Fluorophenyl)-p-fluorobenzylidenepiperidine Hydrochloride

A solution of 82 g. (0.237 mole) of 1-acetyl-4-[α-(p-fluorophenyl)-α-hydroxy]-p-fluorobenzylpiperidine in 200 ml. 6N hydrochloric acid and 100 ml. of methanol was heated at reflux for about 5 hours. The mixture was cooled and made basic with sodium hydroxide and extracted with benzene. The combined benzene extracts were washed with water, dried over magnesium sulfate, filtered, and the filtrate was concentrated under reduced pressure. The residual solid was triturated in isooctane and filtered. The collected solid weighed 60.2 g. (91%). A portion of the solid was converted to the hydrochloride salt which was recrystallized from isopropanol-isopropyl ether and melted at 198°–200°C.

Analysis: Calculated for $C_{18}H_{18}ClF_2N$: C, 67.19; H, 5.64; N, 4.35. Found: C, 66.58; H, 5.85; N, 4.31.

PREPARATION 3

4-(α-Cyclohexyl)benzylidenepiperidine

Using the procedure of Preparation 1, 60 g. (0.19 mole) of 1-acetyl-4-(α-cyclohexyl-α-hydroxy)benzylpiperidine was dehydrated and deacetylated in an ethanol-hydrochloric acid solution to give 41.2 g. (85%) of the title compound (b.p. 120°–7°C./0.10 mm.). The hydrochloride salt was prepared; m.p. 269°–71°C. The hydrochloride salt was analyzed.

Analysis: Calculated for $C_{18}H_{26}ClN$: C, 74.08; H, 8.98; N, 4.80. Found: C, 74.05; H, 9.01; N, 4.67.

PREPARATION 4

4-(α-m-Trifluoromethylphenyl)benzylidenepiperidine

Using the procedure of Preparation 1, 66 g. (0.197 mole) of 4-[α-(m-trifluoromethylphenyl)-α-hydroxy]-benzylpiperidine was dehydrated in an ethanol-hydrochloric acid solution to give the title compound, the nuclear magnetic resonance spectrum of which agreed with the proposed structure.

PREPARATION 5

4-(α-Phenyl)benzylidenepiperidine

Using the procedure of Preparation 1, 35 g. (0.113 mole) of 1-acetyl-4-(α-phenyl-α-hydroxy)benzylpiperidine was dehydrated in an ethanol-hydrochloric acid solution to give 27.4 g. (97%) of the title compound, the nuclear magnetic resonance spectrum of which agreed with the proposed structure.

The novel compounds of the present invention can be prepared by several methods. Thus, a selected 4-benzylidenepiperidine of Formula II can be: (a) reacted with a compound R—X (III) wherein X is a reactive halide radical such as chlorine, bromine or iodine, chlorine being a preferred halide; (b) reacted with an isocyanate compound (IV); (c) reacted with nitrourea (V) and (d) reacted with a 4-substituted dioxolane-2-one (VI), the reaction sequence being:

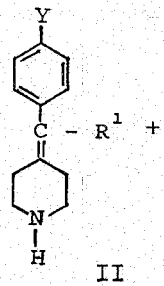
II (a) R—X   III
(b) RNCO   IV
(c) $O_2N$—$NHCONH_2$ V
(d) 4-subst.dioxolane-2-one VI

→

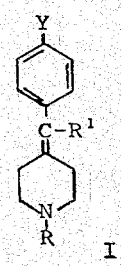
I wherein R, R¹ and Y are as hereinabove defined.

The foregoing reaction (a) is carried out in alcoholic solvents such as methanol, ethanol, propanol, 1-butanol, or in a solvent such as dimethylformamide, in the presence of an acid acceptor as, for example, sodium carbonate, potassium carbonate, sodium bicarbonate, and the like. The reaction time can vary from about 3 to about 24 hrs. depending on the reactivity of the halide reactant and the reaction temperature employed which can vary from about 80°C. to about 125°C. The foregoing reaction (b) is carried out in a dry inert solvent as, for example, benzene, toluene, xylene, and the like, or in an ether solvent such as tetrahydrofuran. The reactions are preferably run at about room temperature and are generally complete in about 2 hrs. The foregoing reaction (c) is carried out in a lower alcoholic solvent such as ethanol, 1-butanol, and the like, or in a mixed alcohol-halogenated aliphatic solvent such as ethanol-chloroform. The reaction is preferably run at the boiling point of the selected solvent or solvent system and for a reaction period of from about 1 hour to about 3 hours. The foregoing reaction (d) is carried out in an inert hydrocarbon solvent such as benzene, toluene, xylene, or the like. The reaction is run at the reflux temperature of the selected solvent and in the presence of a base as, for example, an alkali alkoxide, until the reaction is complete.

The details of the foregoing procedures are exemplified in Examples 1–6. Examples 7–15 summarized in Tables 1 and 2 are prepared using the procedures described in Examples 1–6.

EXAMPLE 1

1-[3-(p-Acetyl-o-methoxyphenoxy)propyl]-4-(α-cyclohexyl) benzylidenepiperidine Oxalate A mixture of 5.1 g. (0.02 mole) of 4-(α-cyclohexyl)-benzylidene piperidine, 4.9 g. (0.02 mole) of 3-(p-acetyl-o-methoxyphenoxy) propyl chloride, and 3.5 g. (0.04 mole) of sodium bicarbonate in 100 ml. of dimethylformamide was stirred and refluxed for 20 hours. After cooling, the reaction mixture was diluted to about 800 ml. with water. The mixture was extracted with benzene followed by chloroform extraction. The combined extracts were washed with water, dried over anhydrous magnesium sulfate and filtered. The filtrate was concentrated under reduced pressure and gave 8.0 g. of crude product. The crude residue was dissolved in benzene and placed on a magnesium silicate column. The product obtained by eluting with an acetone-benzene gradient weighed 3.4 g. (36.8%). The free base was converted to the oxalate salt. Recrystallization from isopropanol gave the product melting at 184°–185°C.

Analysis: Calculated for $C_{32}H_{41}NO_7$: C, C, H, 7.49; N, 2.54. Found: C, 69.83; H, 7.58; N, 2.56.

EXAMPLE 2

4-(α-Cyclohexyl)-p-fluorobenzylidene-1-[3-(p-fluorobenzoyl) propyl]piperidine

A mixture of 5.0 g. (0.0196 mole) of 4-(α-cyclohexyl)-p-fluorobenzylidenepiperidine. 5.4 g. (0.022 mole) of 2-(3-chloropropyl)-2-(p-fluorophenyl)dioxolane and 4.2 g. (0.05 mole) of sodium bicarbonate in 100 ml. of 1-butanol was refluxed for 24 hours. The mixture was filtered and the filtrate was concentrated under reduced pressure. The residual oil was dissolved in 60 ml. of ethanol and stirred with 50 ml. of 6N hydrochloric acid for 12 hours. The reaction mixture was diluted to about 800 ml. with water and made basic with 50% sodium hydroxide. The basic mixture was extracted with benzene, and the combined extracts were dried over anhydrous magnesium sulfate. The mixture was filtered, and the filtrate was concentrated under reduced pressure to give 5.4 g. of oil. This residual oil was dissolved in benzene and placed on a magnesium silicate column. Elution using an acetone-benzene gradient gave the product weighing 2.8 g. (34.2%). The product was recrystallized from isopropanol-water and gave the compound melting at 73°–75°C.

Analysis: Calculated for $C_{28}H_{34}NOF$: C, 80.15; H, 8.17; N, 3.34. Found: C, 80.05; H, 8.22; N, 3.23.

EXAMPLE 3

1-[2-Hydroxy-3-(o-methoxyphenoxy)propyloxycarbonyl]-4-(α-phenyl)-p-fluorobenzylidenepiperidine A mixture of 5.4 g. (0.02 mole) of 4-(α-phenyl)-p-fluorobenzylidenepiperidine and 4.05 g. (0.018 mole) of 5-(o-methoxyphenoxymethyl)dioxolane-2-one in 100 ml. of toluene was heated at reflux for 7 days. At this point, thin-layer chromatography showed starting amine still remaining. Half of the solution was heated at reflux with an equivalent amount of sodium methoxide for 3 days. The reaction mixtures were combined and washed twice with 150 ml. portions of 2N hydrochloric acid. The toluene layer was then washed with 200 ml. of water followed by 200 ml. of 10% sodium bicarbonate solution. After washing again with 200 ml. of water, the toluene solution was dried over anhydrous magnesium sulfate. The mixture was filtered, the toluene filtrate was removed under reduced pressure to give approximately 8 g. of viscous brown oil. The residual brown oil was dissolved in benzene and placed on a magnesium silicate column. Elution with an acetone-benzene gradient produced 3.0 g. (30.6%) of product. The product was a viscous yellow oil which did not crystallize.

Analysis: Calculated for $C_{29}H_{30}NO_5F$: C, 70.86; H, 6.15; N, 2.85. Found: C, 70.51; H, 6.11; N, 2.78.

EXAMPLE 4

4-(α-p-Fluorophenyl)-p-fluorobenzylidene piperidinecarboxamide

A mixture of 4.7 g. (0.0165 mole) of 4-(α-p-fluorophenyl)-p-fluorobenzylidenepiperidine and 1.8 g. (0.017 mole) of nitrourea was refluxed in about 50 ml. of 95% ethanol for 1 hour. The mixture was concentrated under reduced pressure and the crystalline residue was triturated in isopropyl ether. After filtering, the 3.7 g. (68.5%) of solid product was recrystallized from benzene-isopropyl ether. The white solid melted at 190.5°–192.5°C.

Analysis: Calculated for $C_{19}H_{18}F_2N_2O$: C, 69.50; H, 5.53; N, 8.53. Found: C, 69.43; H, 5.56; N, 8.43.

EXAMPLE 5

4-(α-Cyclohexyl)benzyldidene-1-piperidinecarboxanilide

Under anhydrous conditions, a solution of 2.35 g. (0.0196 mole) of phenylisocyanate in 25 ml. of dry benzene was added dropwise to a stirring solution of 5.0 g. (0.0196 mole) of 4-(α-cyclohexyl) benzylidene piperidine in 75 ml. of dry benzene. The product separated from solution, and 6.3 g. (86%) of solid was obtained by filtering. The product was recrystallized from benzene-isooctane to give 4.9 g. melting at 222°–224°C.

Analysis: Calculated for $C_{25}H_{30}N_2O$: C, 80.18; H, 8.07; N, 7.48. Found: C, 80.40; H, 8.08; N, 7.42.

EXAMPLE 6

N-Methyl-4-(α-p-fluorophenyl)-p-fluorobenzylidene-1-piperidinecarboxamide

Under anhydrous conditions, 1.2 g. (0.02 mole) of methyl isocyanate in 20 ml. of dry benzene was added dropwise to a stirring solution of 5.7 g. (0.02 mole) of 4-(α-p-fluorophenyl)-p-fluorobenzylidene piperidine in 100 ml. of dry benzene. After 2 hours of stirring thin layer chromatography showed the reaction to be complete. The solvent was removed at reduced pressure and 6.8 g. (99%) of crude solid was obtained. The solid was recrystallized from benzene-isopropyl ether to give 5.3 g. melting at 155.5–157.5°C.

Analysis: Calculated for $C_{20}H_{20}N_2OF_2$: C, 70.16; H, 5.89; N, 8.18. Found: C, 70.32; H, 5.94; N, 7.90.

The physical constants of some representative 1-substituted-4-(α-substituted)benzylidene- and p-fluorobenzylidenepiperidines made by the processes disclosed hereinabove and set forth in detail in Examples 1–6 are shown in Table I and Table II.

Table I - Examples 7 - 15

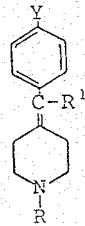

| Example | R | R¹ | Y | M.P. °C. | Salt |
|---|---|---|---|---|---|
| 7 | —$FC_6H_4COC_3H_6$— | —$CF_3C_6H_4$— | H | 104–6.5 | $C_2H_4O_2$ |
| 8 | '' | $C_6H_5$— | F | 106.5–8 | — |
| 9 | '' | p—$FC_6H_4$ | F | 108–10 | — |
| 10 | p—$CH_3CO$—o—$CH_3OC_6$-$H_3OC_3H_6$— | m—$CF_3C_6H_4$— | H | 120–5 | $C_2H_4O_2$ |
| 11 | '' | $C_6H_5$ | F | 143–5 | $C_2H_4O_2$ |
| 12 | '' | p—$FC_6H_4$— | F | 169–70 | $C_2H_4O_2$ |
| 13 | $C_6H_5NHCO$ | $C_6H_5$— | F | 217–7.5 | — |
| 14 | '' | $C_6H_5$— | H | 234–5 | — |
| 15 | '' | m—$CF_3C_6H_4$ | H | 152–4 | — |

Note: $C_2H_4O_2$ is oxalate

The compounds of the invention are generally characterized by the pharmacological activity hereinbefore stated, making them useful in counteracting certain physiological abnormalities in a living animal body. Effective quantities of the pharmacologically active compounds of the invention may be administered to a living animal body in any one of various ways, for example, orally as in capsules or tablets, parenterally in the form of sterile solutions, suspensions, and in some cases intravenously in the form of sterile solutions. Other modes of administration are cutaneous, subcutaneous, intramuscular and intraperitoneal.

Pharmaceutical formulations are usually prepared from a predetermined quantity of one or more of the compounds of the invention, preferably in solid form. Such formulations may take the form of powders, elixirs, solutions, pills, capsules, or tablets, with or without, but preferably with, any one of a large variety of pharmaceutically acceptable vehicles or carriers. When in admixture with a pharmaceutical vehicle or carrier, the active ingredient usually comprises from about 0.01 to about 75%, normally from about 0.05 to about 25%, by weight of the composition. Carriers such as starch, sugar, talc, commonly used synthetic and natural gums, water, and the like, may be used in such formulations. Binders such as gelatin, and lubricants such as sodium stearate, may be used to form tablets. Disintegrating agents such as sodium bicarbonate may also be included in tablets.

Although relatively small quantities of the active materials of the invention, even as low as 0.1 mg., may be used in cases of administration to subjects having a relatively low body weight, unit dosages are usually 5 mg. or above, and preferably 25, 50, or 100 mg. or even higher, depending, of course, upon the subject treated and the particular result desired. The usual broader ranges appear to be 1–200 mg. per unit dose. The active agents of the invention may be combined for administration with other pharmacologically active agents, such as buffers, antacids, or the like, and the proportion of the active agent or agents in the composi- Table II

| | Empirical | Analytical Data on Examples 7–15 Calculated | | | Found | | |
|---|---|---|---|---|---|---|---|
| Example | Formula | C | H | N | C | H | N |
| 7 | $C_{31}H_{29}F_4NO_3$ | 65.14 | 5.11 | 2.45 | 64.90 | 5.11 | 2.35 |
| 8 | $C_{28}H_{27}F_2NO$ | 77.94 | 6.31 | 3.25 | 77.61 | 6.40 | 3.14 |
| 9 | $C_{28}H_{26}F_3NO$ | 74.82 | 5.83 | 3.12 | 74.53 | 5.97 | 2.98 |
| 10 | $C_{33}H_{34}F_3NO_7$ | 64.59 | 5.58 | 2.28 | 64.34 | 5.72 | 2.04 |
| 11 | $C_{32}H_{34}FNO_7$ | 68.19 | 6.08 | 2.49 | 68.14 | 6.12 | 2.54 |
| 12 | $C_{32}H_{33}F_2NO_7$ | 66.08 | 5.72 | 2.41 | 66.01 | 5.67 | 2.40 |
| 13 | $C_{25}H_{23}FN_2O$ | 77.70 | 6.00 | 7.25 | 77.63 | 6.01 | 7.24 |
| 14 | $C_{25}H_{24}N_3O$ | 81.49 | 6.57 | 7.60 | 81.70 | 6.60 | 7.53 |
| 15 | $C_{26}H_{23}F_3N_2O$ | 71.54 | 5.31 | 6.42 | 71.44 | 5.36 | 6.58 | tions may be varied widely. It is only necessary that the active ingredient of the invention constitute an effective amount, i.e., such that a suitable effective dosage will be obtained consistent with the dosage form employed. Obviously, several unit dosage forms may be administered at about the same time. The exact individual doses, as well as daily dosage, in a particular case will, of course, be determined according to well-established principles under the direction of a physician or a veterinarian.

It is to be understood that the invention is not to be limited to the exact details of operation or exact compounds, compositions, or procedures shown and described, as obvious modifications and equivalents will be apparent to one skilled in the art, and the invention is therefore to be limited only by the scope of the appended claims.

We claim:

1. A compound selected from 1-substituted-4-benzylidenepiperidine having the formula:

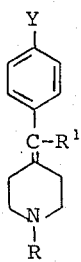

wherein;

R is selected from the group consisting of acetyl, p-fluorobenzoylpropyl, p-acetyl-o-methoxyphenoyxpropyl, carbamoyl, N-loweralkylcarbamoyl, N,N-dilower-alkycarbamoyl, 2-hydroxy-3-(o-methoxyphenoxy)propyloxycarbonyl, N-phenylcarbamoyl optionally substituted in the phenyl ring by acetyl, lower-alkoxy, lower-alkyl, trifluoromethyl, chlorine, bromine or fluorine, $R^1$ is selected from the group consisting of phenyl, p-fluorophenyl, m-trifluoromethylphenyl, or cyclohexyl, Y is selected from the group consisting of hydrogen or fluorine, with the proviso that when Y is hydrogen and $R^1$ is phenyl, R is other than p-fluorobenzoylpropyl, and the pharamceutically acceptable acid addition salts of the basic compounds thereof.

2. A compound of claim 1 wherein Y represents fluorine.

3. A compound of claim 2 which is 1-[3-(p-acetyl-o-methoxyphenoxy) propyl]-4-($\alpha$-p-fluorophenyl)-p-fluorobenzylidenepiperidine.

4. A compound of claim 2 which is 1-[3-(p-fluorobenzoyl) propyl]-4-($\alpha$-p-fluorophenyl)-p-fluorobenzylidenepiperidine.

5. A compound of claim 2 which is N-methyl-4-($\alpha$-p-fluorophenyl)- p-fluorobenzylidene-1-piperidinecarboxamide.

6. A compound of claim 1 wherein Y represents hydrogen.

7. A compound of claim 6 which is 1-[3-(p-acetyl-o-methoxyphenoxy) propyl]-4-($\alpha$-m-trifluoromethylphenyl)benzylidenepiperidine.

8. A compound of claim 6 which is 1-[3-(p-fluorobenzoyl)propyl]-4-($\alpha$-m-trifluoromethylphenyl)-benzylidinepiperidine.

* * * * *

UNITED STATES PATENT AND TRADEMARK OFFICE
CERTIFICATE OF CORRECTION

PATENT NO. : 3,922,276
DATED : Nov. 25, 1975
INVENTOR(S) : Robert Louis Duncan, Jr.; Robert Frederick Boswell, Jr.

It is certified that error appears in the above–identified patent and that said Letters Patent are hereby corrected as shown below:

Col. 7, Table I - Examples 7 - 15, the footnote under the table should read --$C_2H_2O_4$-- instead of as it reads in the patent.

Signed and Sealed this

Eighth Day of February 1977

[SEAL]

Attest:

RUTH C. MASON
*Attesting Officer*

C. MARSHALL DANN
*Commissioner of Patents and Trademarks*